(12) United States Patent
Hosaka

(10) Patent No.: US 7,286,101 B2
(45) Date of Patent: Oct. 23, 2007

(54) IMAGE DISPLAY METHOD AND IMAGE DISPLAY SYSTEM

(75) Inventor: Toshiyuki Hosaka, Matsumoto (JP)

(73) Assignee: Seiko Epson Corporation (JP)

( * ) Notice: Subject to any disclaimer, the term of this patent is extended or adjusted under 35 U.S.C. 154(b) by 579 days.

(21) Appl. No.: 10/742,697

(22) Filed: Dec. 19, 2003

(65) Prior Publication Data

US 2004/0183968 A1    Sep. 23, 2004

(30) Foreign Application Priority Data

Dec. 20, 2002   (JP)   ............................ 2002-370066

(51) Int. Cl.
*G09G 5/00*    (2006.01)
(52) U.S. Cl. .................. 345/1.2; 345/2.2; 359/449; 359/452; 359/454; 359/459
(58) Field of Classification Search ............... 359/449, 359/443, 452, 454, 455, 456, 459; 345/1.1, 345/1.2, 2.2
See application file for complete search history.

(56) References Cited

U.S. PATENT DOCUMENTS

| | | | | |
|---|---|---|---|---|
| 5,532,736 | A | * | 7/1996 | Kuriki et al. ............ 348/14.16 |
| 5,912,649 | A | * | 6/1999 | Hattori et al. .................. 345/4 |
| 6,577,355 | B1 | * | 6/2003 | Yaniv ........................... 349/16 |
| 6,616,284 | B2 | * | 9/2003 | Yaniv et al. .................. 353/79 |
| 7,057,578 | B2 | * | 6/2006 | Yaniv ........................... 345/1.1 |
| 2003/0063243 | A1 | * | 4/2003 | Roosendaal et al. ........ 349/113 |
| 2003/0214632 | A1 | * | 11/2003 | Ma et al. ...................... 353/31 |
| 2006/0012876 | A1 | * | 1/2006 | Choi ........................... 359/452 |

FOREIGN PATENT DOCUMENTS

| | | |
|---|---|---|
| JP | 63-172259 | 7/1988 |
| JP | 2001-242546 | 9/2001 |

* cited by examiner

*Primary Examiner*—Sumati Lefkowitz
*Assistant Examiner*—Seokyun Moon
(74) *Attorney, Agent, or Firm*—Harness, Dickey & Pierce, P.L.C.

(57) ABSTRACT

Images are displayed on an image display screen by projection light for displaying images onto the image display screen. The image display screen is integrally formed with diffusion/reflective parts, which reflect the projection light on a side of the image display screen on which the projection light is incident, and diffusion/transmissive parts, which transmit the projection light in a direction in which the projection light is incident. A first image, which is visible from a side on which the projection light is incident on the image display screen, is displayed by projecting front side projection light onto the diffusion/reflective parts, and a second image, that is visible from a back side of the image display screen, is displayed by projecting back side projection light onto the diffusion/transmissive parts. By doing so, an image display system and method with an improved advertising effect can be provided at low cost.

10 Claims, 4 Drawing Sheets

IMAGE DISPLAY METHOD AND IMAGE DISPLAY SYSTEM

BACKGROUND OF THE INVENTION

1. Field of the Invention

The present invention relates to an image display method and an image display system that display images by projection light used for displaying images.

2. Description of the Related Art

In recent years, image display systems that include a projector and a screen (image display screens) have often been used for presentations, for watching movies in the home, and the like. In such image display systems, the screens used with the projectors can be normally classified into two types, reflective screens and transmissive screens. With a reflective screen, the projection light that is projected by a projector is reflected and diffused on the incident side, so that a visible image can be displayed from the display side (the incident side for the projection light). On the other hand, with a transmissive screen, the projection light is transmitted and diffused in the direction in which the projection light is incident, so that a visible image can be displayed from a back surface (one example of such is the transmissive screen disclosed by Japanese Laid-Open Patent Publication No. 2001-242546.

Printed materials such as posters are often attached to a show window in a store or the like to inform customers of a sale or event and so encourage customers to make purchases. However, with this kind of promotional means, only an ordinary static display is possible, which makes it difficult to attract customers' attention to such promotional means. As a result, there has been the problem that it has not been possible to sufficiently inform customers of a sale or other event. Further problems are caused by the cost of producing posters and the need to manually replace such posters whenever there is a sale or event. As one solution, image display systems constructed of a transmissive screen and a projector have started to be introduced in recent years. With such an image display system, the transmissive screen is attached to a show window or the like and projection light for displaying images is projected onto the screen from the projector that has been set up inside the store. By doing so, it is possible to display moving images that promote a sale or an event and can be viewed from outside the show window. Accordingly, with this image display system, since the displaying of moving images in a show window (specifically on a transmissive screen attached to a show window) is itself novel, it is possible to attract customers' attention to the moving images, resulting in the customers being sufficiently informed of sales and other events. It is also possible to produce advertising images at a low cost using a personal computer, for example, and the need to manually change posters and the like can be avoided.

However, conventional image display systems that are used for advertising purposes have the following problem. When images are displayed on a screen that has been attached to a show window, the projector of the image display system has to be set up inside the store, so that it is possible to view the images only from outside the show window, that is, from outside the store. This means that with this image display system, there is the problem that the system does not have any advertising effect on customers inside the store. It would be conceivable to use a method where the advertising effect is improved by attaching a reflective screen to a show window or the like separately to the transmissive screen so that images can be displayed separately to the customers inside the store. However, since it would be necessary to use two costly projectors, this method is difficult to implement due to the high cost involved.

SUMMARY

The present invention was conceived in view of the stated problems, and it is an object of the present invention to provide an image display system and image display method that have an increased advertising effect but can be realized at low cost.

To achieve the stated object, an image display method according to the present invention displays images on an image display screen by projection light for displaying the images, the image display screen being integrally formed with a reflective part, which reflects the projection light on a side (hereinafter "incident side") of the image display screen on which the projection light is incident, and a transmissive part, which transmits the projection light in a direction in which the projection light is incident, the method comprising a step of projecting first projection light onto the reflective part to display a first image that is visible from the incident side and projecting second projection light onto the transmissive part to display a second image that is visible from an opposite side (hereinafter "back side") of the image display screen to the incident side.

The first image and the second image may have the same display content as one another.

Alternatively, the first image and the second image may have different display contents.

The image display screen may include a plurality of the reflective parts and a plurality of the transmissive parts, each of which is formed as a narrow strip, and the image display screen may be composed by disposing the reflective parts and the transmissive parts alternately in parallel in one of a horizontal direction and a vertical direction, and the step of projecting the first projection light onto the respective reflective parts and the second projection light onto the respective transmissive parts.

The image display screen may include a plurality of the transmissive parts, and the first and second images may be displayed on the image display screen that is formed so that gaps between the transmissive parts on the back side are a dark color.

An image display system according to the present invention includes an image display screen that displays images in accordance with projection light for displaying images and a projector that projects the projection light, wherein the image display screen is integrally formed with a reflective part, which displays an image that is visible from the incident side by reflecting the projection light on a side (hereinafter "incident side") of the image display screen on which the projection light is incident, and a transmissive part, which displays an image that is visible from an opposite side (hereinafter "back side") of the image display screen to the incident side by transmitting the projection light in a direction in which the projection light is incident, and the projector projects first projection light for displaying a first image onto the reflective part and projects second projection light for displaying a second image onto the transmissive part.

The projector may project the first projection light and the second projection light for displaying the first image and the second image that respectively have the same display content onto the reflective part and the transmissive part.

The projector may project the first projection light and the second projection light for displaying the first image and the second image that respectively have different display contents onto the reflective part and the transmissive part.

The image display screen may include a plurality of the reflective parts and a plurality of the transmissive parts, each of which is formed as a narrow strip, and the image display screen may be composed by disposing the reflective parts and the transmissive parts alternately in parallel in one of a horizontal direction and a vertical direction.

The image display screen may include a plurality of the transmissive parts and may be formed so that gaps between the transmissive parts on the back side are a dark color.

According to this image display method and this image display system, by projecting first projection light onto reflective parts and second projection light onto transmissive parts of an image display screen that is integrally formed with one or more reflective parts that reflect the projection light on the incident side and one or more transmissive parts that transmit light in the direction in which the projection light is incident, a single projector can simultaneously display both the first image and the second image. Accordingly, it is possible to display advertising images to customers both in a store and outside the store, for example, without using two projectors, so that advertising can be reliably and sufficiently displayed to a larger number of customers than with a conventional image display system. It is therefore possible to reliably and sufficiently increase the advertising effect at low cost.

Also, according to this image display method and this image display system, by displaying the same display content as the first image and the second image, it is possible for customers who have seen part of an advertising moving image outside a store, for example, to view the next part of the moving image after entering the store. Conversely, by displaying different display contents as the first image and the second image, such as by displaying an image that simply and directly informs customers outside a store of an event or sale and an image that displays the prices of items on sale and/or a detailed guide to the store layout to customers inside the store, it is possible to simultaneously display two images that are appropriate for customers' needs. In addition, by disposing a plurality of narrow strip-like reflective parts and a plurality of narrow strip-like transmissive parts alternately in parallel in the vertical direction on the image display screen, it is possible to display images that have been enlarged or reduced in the horizontal direction with no misalignment, so that even if trapezoidal distortion occurs in an image or images when the projection light is projected onto the image display screen diagonally from above or diagonally from below for example, such trapezoidal distortion can be easily rectified by merely performing trapezoidal distortion correction. Also, by disposing a plurality of narrow strip-like reflective parts and a plurality of narrow strip-like transmissive parts alternately in parallel in the horizontal direction on the image display screen, it is possible to display images that have been enlarged or reduced in the vertical direction with no misalignment, so that even if trapezoidal distortion occurs in an image or images when the projection light is projected onto the image display screen diagonally from the left side or diagonally from the right side for example, such trapezoidal distortion can be easily rectified by merely performing trapezoidal distortion correction. In addition, by forming gaps between the transmissive parts on the back surface of the image display screen of a dark color, the reflection of natural light and the like can be prevented at such parts, so that a bright display of the second image can be achieved.

BRIEF DESCRIPTION OF THE DRAWINGS

These and other objects and features of the present invention will be explained in more detail below with reference to the attached drawings, wherein.

DETAILED DESCRIPTION

An image display system according to the present invention will now be described in detail with reference to the accompanying drawings showing preferred embodiments thereof.

First, the construction of an image display system 1 will be described with reference to the drawings.

Figure 1:
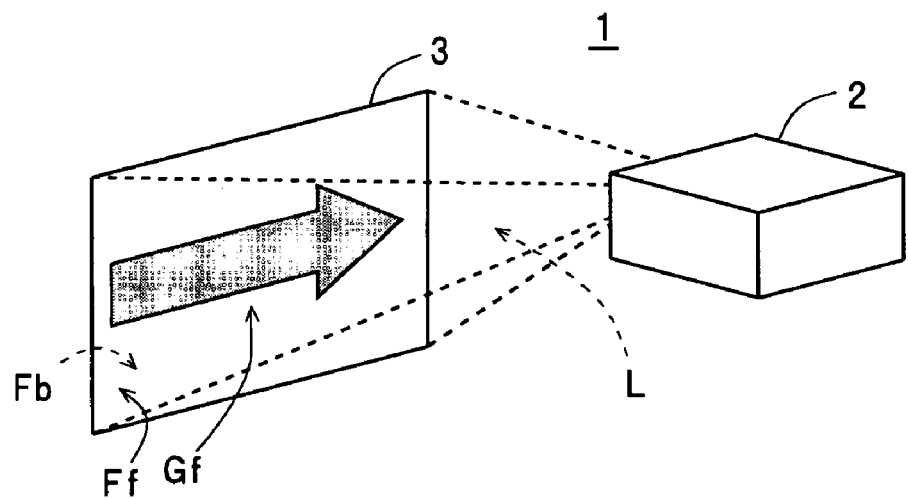
FIG. 1 is a perspective view of a projector and an image display screen that compose an image display system according to an embodiment of the present invention when looking from the projector side.
Figure 3:
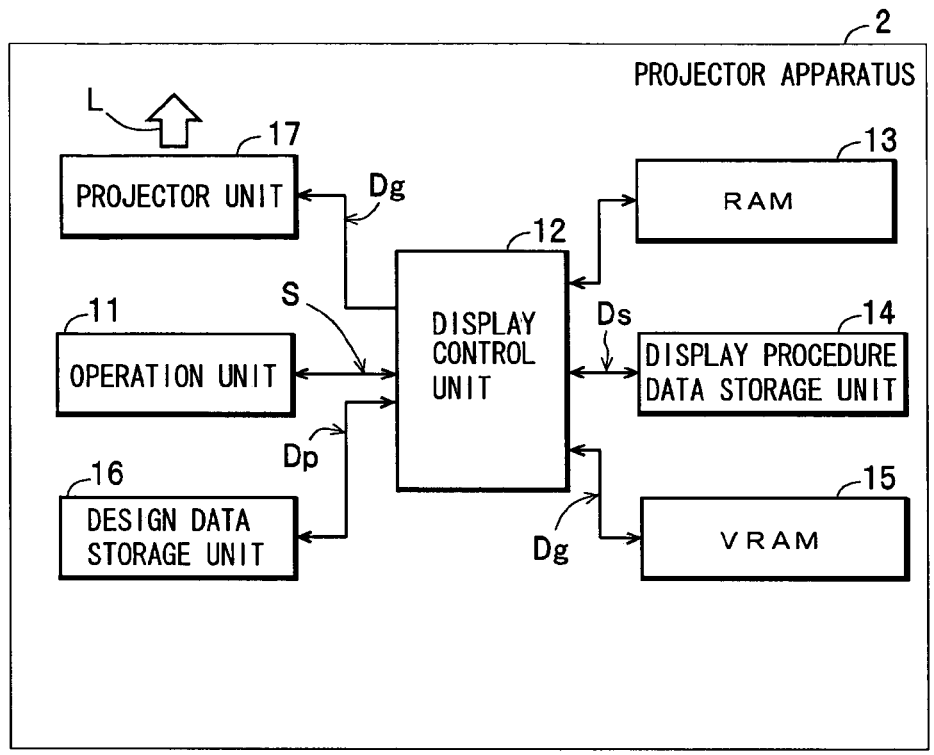
FIG. 3 is a block diagram showing the construction of the projector.

As shown in FIG. 1, the image display system 1 comprises a projector 2 that projects projection light L for displaying images and an image display screen 3 that can display a front side image (a first image) Gf, for example, based on the projection light L. As shown in FIG. 3, the projector 2 comprises an operation unit 11, a display control unit 12, a RAM 13, a display procedure data storage unit 14, a VRAM 15, a design data storage unit 16, and a projector unit 17.

A variety of keys, such as an image selection key for selecting an image to be displayed on the image display screen 3, an alignment key for aligning images, and a trapezoidal distortion correction key for correcting trapezoidal distortion, are laid out to construct the operation unit 11, which outputs an instruction signal S based on a key operation to the display control unit 12. Here, an indication of the display procedure for displaying an image, an indication of designs for constructing an image, and the like are written in the instruction signal S outputted by an operation of the image selection key. The display control unit 12 generates display image data Dg in the VRAM 15 in accordance with the instruction signal S outputted from the operation unit 11 and also outputs the generated display image data Dg to the projector unit 17. The RAM 13 temporarily stores various kinds of data generated by the display control unit 12 and calculation results of the display control unit 12. The display procedure data storage unit 14 stores the display procedure data Ds used when generating the display image data Dg, an operation program of the display control unit 12, and the like. In this case, image data indications, a position and size for displaying an image, an indication of display time, and the like are written in the display procedure data Ds.

The VRAM 15 stores the display image data Dg that the display control unit 12 generates by virtually drawing images corresponding to design data Dp. The design data storage unit 16 stores the design data Dp (such as design data representing arrows, for example) for generating the display image data Dg. The projector unit 17 projects projection light L that is modulated based on the display image data Dg that has been outputted by the display control unit 12. More specifically, the projector unit 17 comprises a light source lamp, a modulating means (as one example, a liquid crystal light valve equipped with a liquid crystal panel, an incident-side polarizing plate, and a irradiation-side polarizing plate) for modulating white light emitted by the light source lamp into the projection light L, and a projection lens for magnifying the projection light L. None of these components are shown. In this case, the projection light L includes front side projection light (first projection light) Lf (see FIG. 5) for displaying the surface side image Gf and backside projection light (second projection light) Lb (see FIG. 5) for displaying a backside image Gb.

Figure 5:
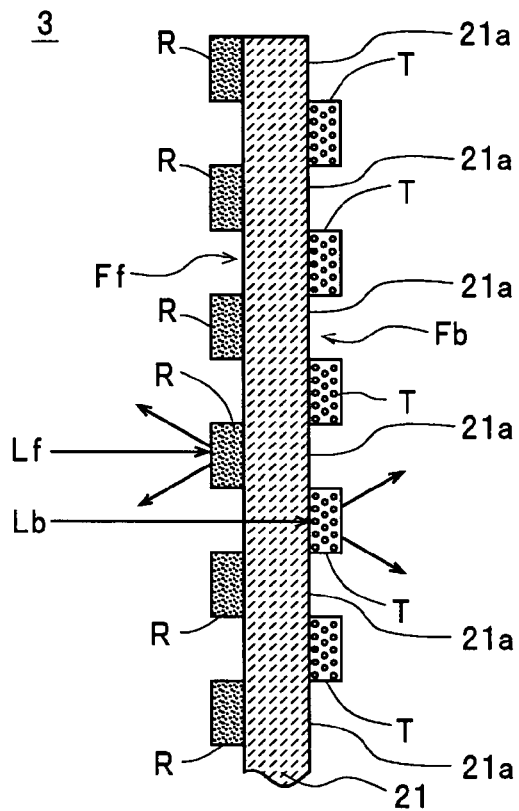
FIG. 5 is a vertical cross-sectional view of the image display screen.

As shown in FIG. 1, the image display screen 3 is constructed so as to appear as a horizontal rectangle when viewed from the front. The image display screen 3 reflects and diffuses projection light L projected by the projector 2 so as to display an image (the front side image Gf shown in FIG. 1, for example) that is visible from a front surface Ff side (the incident side for the projection light L). The image display screen 3 transmits and diffuses the projection light L so as to also display an image (the back side image Gb shown in FIG. 2, for example) that is visible from a back surface Fb (an opposite side to the incident side for the projection light L). More specifically, as shown in FIG. 5, the image display screen 3 is constructed of a resin layer 21, a plurality of diffusion/reflective parts (reflective parts) R and a plurality of diffusion/transmissive parts (transmissive parts) T that are integrally formed. The resin layer 21 is formed of a light-transmissive resin (as one example, vinyl chloride) as a rectangular sheet when viewed from the front. The plurality of diffusion/reflective parts R are formed as narrow strips composed of minute aluminum particles, for example. The plurality of diffusion/transmissive parts T are formed as strips of the same width as the diffusion/reflective parts R by dispersing spherical minute particles of silica evenly (or approximately evenly) in a light-transmissive resin (as one example, vinyl chloride).

Figure 4:
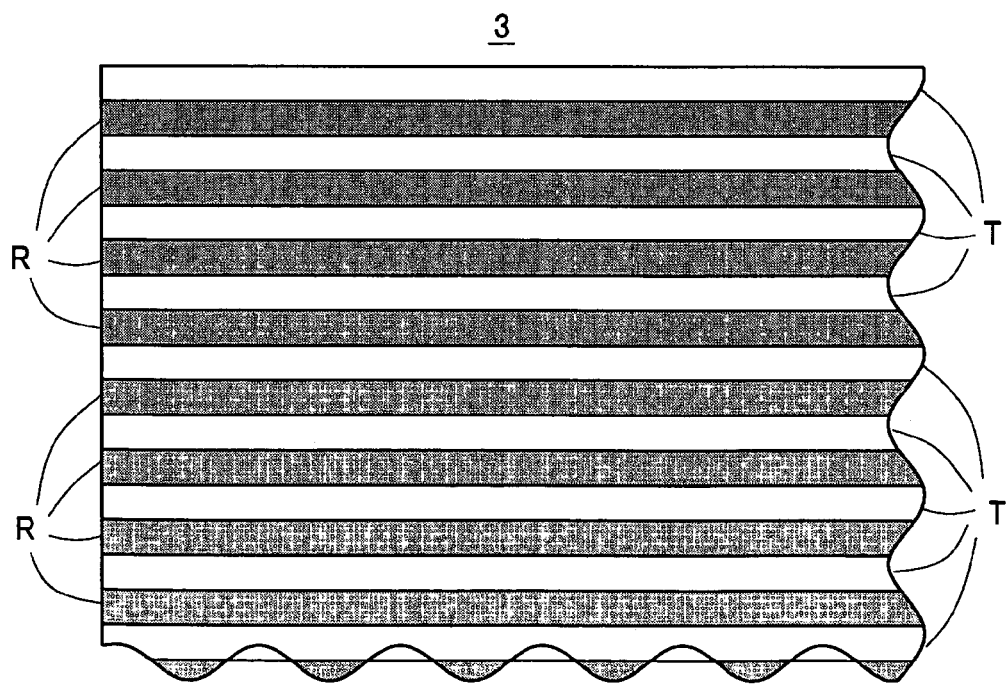
FIG. 4 is a schematic diagram showing the construction of the image display screen.

In this case, as shown in FIG. 5, the diffusion/reflective parts R are disposed in parallel in the vertical direction (the shorter edge direction) on a front surface Ff of the resin layer 21 (the image display screen 3) at a pitch that is double the width of the diffusion/reflective parts R. On the other hand, the diffusion/transmissive parts T are formed on a back surface Fb of the resin layer 21 (the image display screen 3) at positions that are opposite the gaps between the diffusion/reflective parts R. The positions that are opposite the diffusion/reflective parts R on the backside surface Fb of the resin layer 21, that is, the gaps between the diffusion/transmissive parts T on the backside surface Fb are composed of black-colored parts 21a that are colored (formed) with a dark color, such as black. In this case, it is preferable for all of the gaps between the diffusion/transmissive parts T, that is, the entire back surface Fb aside from the diffusion/transmissive parts T, to be colored with a dark color, though coloring the entire back surface Fb is not necessarily required, and as a minimum it is sufficient to color part of an outer circumference of each of the diffusion/transmissive parts T. As shown in FIG. 4, with the image display screen 3, when looking from the front surface Ff side (or the back surface Fb side), the resin layer 21 is in a light transmittance state, so that the diffusion/reflective parts R and the diffusion/transmissive parts T are visible in a state where the diffusion/reflective parts R and the diffusion/transmissive parts T are disposed alternately in parallel in the vertical direction. Here, as shown in FIG. 5, each of the diffusion/reflective parts R diffuses and reflects front side projection light Lf included in the projection light L on the incident side, so that as a whole, the front side image Gf is displayed. As shown in the same drawing, each of the diffusion/transmissive parts T diffuses and transmits back side projection light Lb including the projection light L in the direction in which the light is incident, so that as a whole, the back side image Gb is displayed.

Next, the entire operation of the image display system 1 when displaying images will be described with reference to the drawings.

First, the image display screen 3 is attached by tightly attaching the back surface Fb of the image display screen 3 to the inside of a show window in a store or the like using a transparent adhesive, for example. Here, the "inside" of the show window is the side inside the store. The projector 2 is set up so as to hang from a ceiling of the store, for example, at a predetermined distance from the image display screen 3. Next, the projection light L is projected from the projector 2 and the projection angle of the projection light L is adjusted so that the projected projection light L onto the image display screen 3. Next, the image selection key of the operation unit 11 of the projector 2 is operated and an image for alignment purposes (for example, a front side image Gf shown in FIG. 1) that is displayed on the front surface Ff of the image display screen 3 and an image for alignment purposes (for example, a back side image Gb shown in FIG. 2) that is displayed on the back surface Fb of the image display screen 3 are selected. Accordingly, the operation unit 11 outputs the instruction signal S and the display control unit 12 executes image processing in accordance with the instruction signal S.

In this image processing, the display control unit 12 first reads the display procedure data Ds, which is indicated by the instruction signal S, from the display procedure data storage unit 14 and specifies the image contents to be displayed. Next, in accordance with the display procedure specified by the display procedure data Ds, the display control unit 12 reads, from the design data storage unit 16, the design data Dp (in this case, design data Dp1 corresponding to the front side image Gf and design data Dp2 corresponding to the back side image Gb) that is required for the generation of the display image data Dg for displaying the front side image Gf and the back side image Gb. Next, the display control unit 12 virtually draws (stores) the designs respectively corresponding to the read design data Dp1, Dp2 in the VRAM 15 to generate the display image data Dg.

Figure 6:
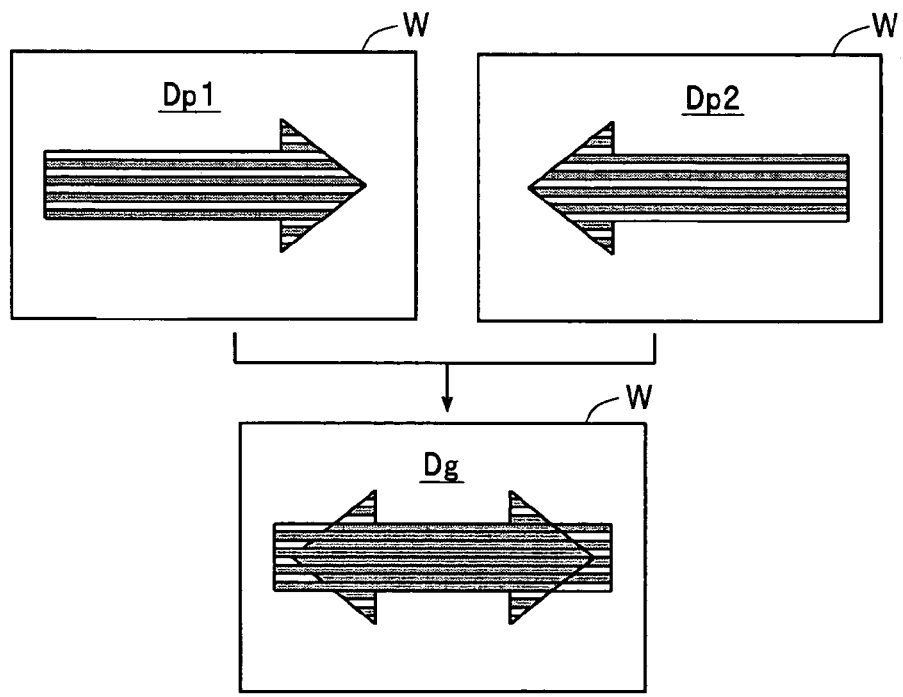
FIG. 6 is a schematic diagram showing images that respectively correspond to design data and display image data that have been virtually drawn on a virtual screen.

In this case, as shown by the upper left image in FIG. 6, the design corresponding to the design data Dp1 is composed of a right-pointing arrow that is drawn in stripes of a predetermined pitch. Also, as shown by the upper right image in the same drawing, the design corresponding to the design data Dp2 is composed of a left-pointing arrow that is drawn in stripes of the same pitch as the image corresponding to the design data Dp1. As shown by the lower image in FIG. 6, the design corresponding to the generated display image data Dg is composed of a design produced by superimposing the designs corresponding to the design data Dp1 and the design data Dp2 on one another. Here, the pitch of the stripes is set at a length produced by reducing the pitch of the diffusion/reflective parts R on the image display screen 3 by the ratio of the size of the design corresponding to the design data Dp1 to the size of the front side image Gf. It should be noted that in FIG. 6, for ease of understanding the present invention, the design corresponding to the design data Dp1, the design corresponding to the design data Dp2, and the design corresponding to the display image data Dg have been illustrated schematically in a state where the designs have respectively been virtually drawn on a virtual screen W. Also, in FIG. 6, the pitch of the stripes is shown larger than in reality. As the next process, the display control unit 12 outputs the generated display image data Dg to the projector unit 17.

Figure 2:
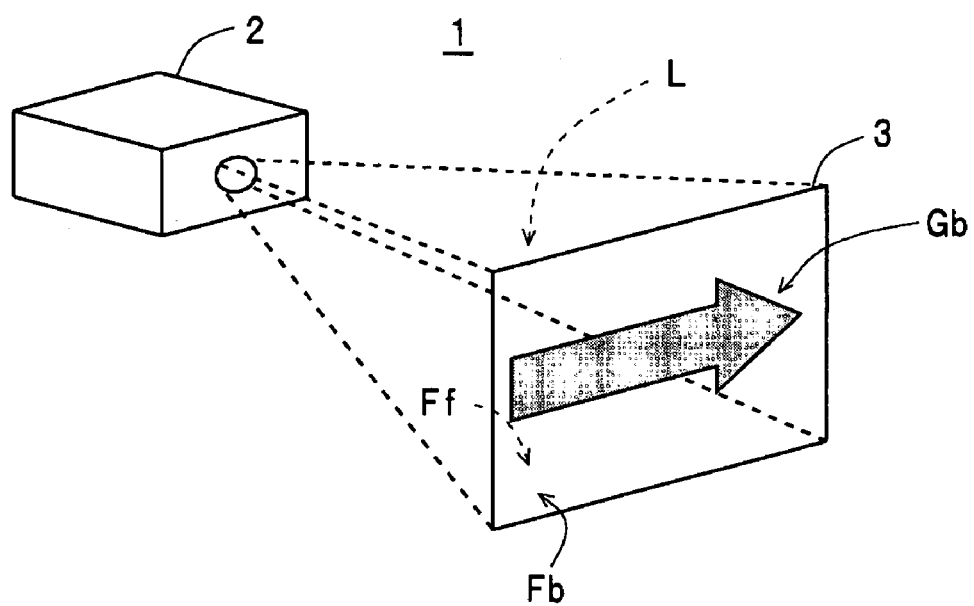
FIG. 2 is a perspective view of the projector and the image display screen when looking from the projector side.

On the other hand, the projector unit 17 modulates the white light emitted from the light source lamp based on the outputted display image data Dg to produce the projection light L, and projects the projection light L. Here, the projection light L includes front side projection light Lf that has been shaded and colored in accordance with the design corresponding to the design data Dp1 shown in the upper left of FIG. 6 and back side projection light Lb that has been shaded and colored in accordance with the design corresponding to the design data Dp2 shown in the upper right of FIG. 6. Next, the projection light L is projected onto the image display screen 3. At this time, if the projection light L is projected without any misalignment, the projection light Lf out of the projection light L is projected onto the diffusion/reflective parts R and the projection light Lb out of the projection light L is projected onto the diffusion/transmissive parts T, so that the front side image Gf shown in FIG. 1 is displayed on the front surface Ff of the image display screen 3 and the back side image Gb shown in FIG. 2 is displayed on the back surface Fb of the image display screen 3.

On the other hand, when the incident positions of the projection light Lf and the projection light Lb are misaligned upwards or downwards by half of the alignment pitch of the diffusion/reflective parts R (or the diffusion/transmissive parts T), the projection light Lf becomes incident on the diffusion/transmissive parts T and the projection light Lb becomes incident on the diffusion/reflective parts R, so that the image that corresponds to the back side image Gb is displayed on the front surface Ff side and the image that corresponds to the front side image Gf is displayed on the back surface Fb side (that is, the front side image Gf and the back side image Gb are displayed reversed left-to-right). In this case, the alignment key of the operation unit 11 is operated and an alignment that moves the incident position of the projection light L up or down is performed. When trapezoidal distortion (a phenomenon where images are distorted in trapezoidal shapes due to the projection angle of the projection light L) occurs for the displayed front side image Gf or the back side image Gb, the trapezoidal distortion correction key of the operation unit 11 is operated and the trapezoidal distortion is corrected.

Next, the image selection key of the operation unit 11 is operated and the advertising image (the front side image Gf) to be displayed on the front surface Ff side of the image display screen 3 and the advertising image (the back side image Gb) to be displayed on the back surface Fb side are selected. In accordance with this, the operation unit 11 outputs an instruction signal S for displaying the selected images. Next, the display control unit 12 performs the image processing described above in accordance with the instruction signal S and the projector unit 17 projects projection light L that includes the front side projection light Lf and the back side projection light Lb. As a result, the advertising image for the front surface Ff side and the advertising image for the back surface Fb side are respectively displayed on the front surface Ff side and the back surface Fb side of the image display screen 3. In this case, the black-colored parts 21a on the back surface Fb of the resin layer 21 absorb natural light and the like that is incident on the back surface Fb of the image display screen 3 from outside the store, and prevent such light from being reflected. Accordingly, the back side projection light Lb that is transmitted from the back surface Fb side via the diffusion/transmissive parts T can be seen clearly, so that the advertising image displayed on the back surface Fb side appears as a bright image. Here, it is possible to display different images as the displayed contents for the front surface Ff and the back surface Fb. It is also possible to display the same image as the display contents of both sides.

In this way, the present image display system 1 includes an image display screen 3 that is integrally formed with diffusion/reflective parts R, which diffuse and reflect the projection light L on the incident side, and diffusion/transmissive parts T, which diffuse and transmit light in the direction in which the projection light L is incident. By projecting front side projection light Lf onto the diffusion/reflective parts R and back side projection light Lb onto the diffusion/transmissive parts T, a single projector 2 can simultaneously display both the front side image Gf and the back side image Gb. Accordingly, it is possible to display advertising images to customers both in a store and outside the store without using two projectors 2. As such, advertising can be reliably and sufficiently displayed to a larger number of customers than with a conventional image display system, so that it is possible to reliably and sufficiently increase the advertising effect of an image display system at low cost.

Also, by displaying the same display content as the front side image Gf and the back side image Gb, it is possible for customers who have seen part of a advertising moving image outside a store, for example, to view the next part of the moving image after entering the store. Conversely, by displaying different display contents as the front side image Gf and the back side image Gb, such as by displaying an image that simply and directly informs customers outside a store of an event or sale and an image that displays the prices of items on sale and/or a detailed guide to the store layout to customers inside the store, it is possible to simultaneously display two images that are appropriate for customers' needs.

In addition, by forming the image display screen 3 so that narrow strip-like diffusion/reflective parts R and narrow strip-like diffusion/transmissive parts T are disposed alternately in parallel in the vertical direction, it is possible to display images that have been enlarged or reduced in the horizontal direction with no misalignment, so that even if trapezoidal distortion occurs in an image or images when the projection light L is projected onto the image display screen 3 diagonally from above or diagonally from below for example, such trapezoidal distortion can be easily rectified by merely performing trapezoidal distortion correction. In addition, by forming the black-colored parts 21a on the back surface Fb of the resin layer 21, the reflection of natural light and the like can be prevented at those parts, so that a bright display of the back side image Gb can be achieved.

Figure 7:
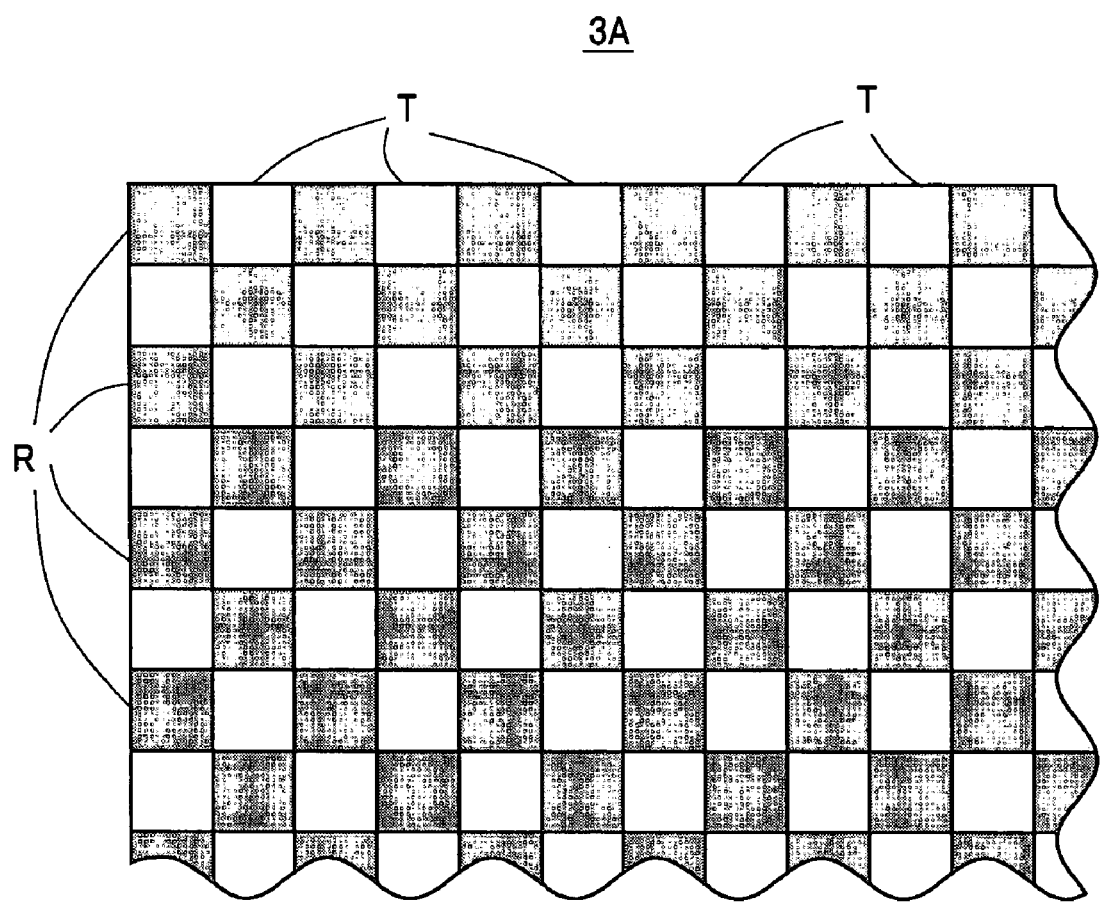
FIG. 7 is a schematic diagram showing the construction of an image display screen according to an alternative embodiment.

It should be noted that the present invention is not limited to the embodiment described above. As one example, in the above embodiment, an example where strip-like diffusion/reflective parts R and diffusion/transmissive parts T are disposed alternately in parallel in the vertical direction on the resin layer 21 is described, though an image display screen may be formed with strip-like diffusion/reflective parts R and diffusion/transmissive parts T that are disposed alternately in parallel in the horizontal direction on the resin layer 21. By using this construction, misalignment of the display position does not occur when images that have been enlarged or reduced in the vertical direction are displayed, so that even if trapezoidal distortion occurs in an image or images when the projection light L is projected onto the image display screen 3 diagonally from a left side or diagonally from a right side of the image display screen 3 for example, such trapezoidal distortion can be easily rectified by merely performing trapezoidal distortion correction. An image display screen 3A shown in FIG. 7 can also be used. In this case, the image display screen 3A is constructed by forming square-shaped diffusion/reflective parts R, for example, with a predetermined pitch in a lattice pattern on the front surface Ff of the resin layer 21 and diffusion/transmissive parts T at positions corresponding to the gaps between the diffusion/reflective parts R on the back surface Fb of the resin layer 21.

In the above embodiment of the present invention, an example where vinyl chloride is used as the resin that forms the resin layer 21 and the diffusion/transmissive parts T is described, but it is possible to use various kinds of transparent resin, such as acrylic resin and polycarbonate resin. Additionally, the spherical minute particles that form the diffusion/transmissive parts T are not limited to silica, and various kinds of inorganic spherical minute particles, such as alumina, or organic spherical minute particles, such as silicone, may be used. The diffusion/transmissive parts T can be formed of aspherical lenses, such as Fresnel lenses or lenticular lenses, or a polarizing film. In addition, holes may be formed in the resin layer 21, with these holes themselves functioning as transmissive parts in place of the diffusion/transmissive parts T. It is also possible to form the diffusion/reflective parts R of minute particles of glass or mica, for example. In this case, a method that attaches such minute particles to the resin layer 21 using an adhesive or the like or a method that applies (paints) a material including such minute particles on the resin layer 21 are examples of how the diffusion/reflective parts R can be formed. Also, an example where the front side image Gf and the back side image Gb are simultaneously displayed is described in the above embodiment, though it is also possible to display only one of the front side image Gf and the back side image Gb. In this case, when the back side image Gb is not displayed, it is possible to see through the image display screen 3 from the front surface side Ff to the back side Fb and from the back side Fb to the front surface side Ff via the resin layer 21 and the diffusion/transmissive parts T. In addition, in the above embodiment, an example where the black-colored parts 21a that are colored black are formed on the back surface Fb of the image display screen 3 is described, though when a transparent resin layer 21 is used, it is possible to color the positions at which the diffusion/reflective parts R are formed on the front surface Ff of the resin layer 21 and/or to color the back surfaces of the diffusion/reflective parts R themselves. In this case, the coloring is not limited to black, and a different dark color may be used, such as gray.

The entire disclosure of Japanese Patent Application No. 2002-370066 filed Dec. 20, 2002 is incorporated by reference.

What is claimed is:

1. A method of displaying images on opposing sides of an image display screen with a single projector, the method comprising:
   emitting a projection light from the single projector to a first side of the image display screen;
   reflecting a first portion of the projection light to display a first image on the first side of the image display screen, the first image being visible only on the first side of the image display screen;
   transmitting a second portion of the projection light through the image display screen to display a second image on the second side of the image display screen, the second side being opposite the first side, the second image being visible only on the second side of the image display screen; and
   providing the first image with a first display content and the second image with a second display content,
   wherein the first side of the image display screen includes a plurality of reflective parts and the second side of the image display screen includes a plurality of transmissive parts, each of the reflective and transmissve parts being a narrow strip, the reflective parts and the transmissive parts being alternately disposed in parallel in one of a horizontal direction and a vertical direction, and
   wherein reflecting the first portion of the projection light includes directing the first portion of the projection light to the reflective parts and transmitting the second portion of the projection light includes directing the second portion of the projection light through the image display screen to the transmissive parts.

2. An image display method according to claim 1, wherein the first display content and the second display content are the same.

3. An image display method according to claim 1, wherein the first display content and the second display content are different.

4. An image display method according to claim 1, wherein the second side of the image display screen includes a plurality of transmissive parts and a plurality of gaps therebetween, the gaps between the transmissive parts being a dark color.

5. An image display system comprising:
   an image display screen having a first side and a second side opposite the first side, the first side including a plurality of reflective parts, the second side including a plurality of transmissive parts; and
   a single projector emitting a projection light to the first side of the image display screen, the single projector directing a first portion of the projection light to the reflective parts, the reflective parts reflecting the first portion of projection light to display a first image on the first side of the image display screen, the first image being visible only on the first side of the image display screen, the first image having a first display content, the single projector directing a second portion of the projection light through the image display screen to the transmissive portions, the transmissive portions transmitting the second portion of projection light to display a second image on the second side of the image display screen, the second image being visible only on the second side of the image display screen, the second image having a second display contents,
   wherein each of the reflective and transmissive parts are a narrow strip, the reflective parts and the transmissive parts being alternately disposed in parallel in one of a horizontal direction and a vertical direction.

6. An image display system according to claim 5, wherein the first display content and the second display content are the same.

7. An image display system according to claim 5, wherein the first display content and the second display content are different.

8. An image display system according to claim 5, wherein the second side of the image display screen includes a plurality of gaps between the transmissive parts, the gaps being a dark color.

9. A method of displaying images on opposing sides of an image display screen with a single projector, the method comprising:

prov鉴定ing a plurality of narrow strip reflective parts on a first side of the image display screen;

providing a plurality of narrow strip transmissive parts on a second side of the image display screen, the second side being opposite the first side, the reflective parts and the transmissive parts being alternately disposed in parallel in one of a horizontal direction and a vertical direction, the second side including a plurality of gaps disposed between the transmissive parts and aligned with the reflective parts, the gaps being a dark color;

emitting a projection light from the single projector to the first side of the image display screen;

directing a first portion of the projection light to the reflective parts, the reflective parts reflecting the first portion of the projection light to display a first image on the first side of the image display screen, the first image being visible only on the first side of the image display screen; and directing a second portion of the projection light through the image display screen to the transmissive parts, the transmissive parts transmitting the second portion of the projection light to display a second image on the second side of the image display screen, the second image being visible only on the second side of the image display screen.

10. An image display system comprising:

an image display screen having a first side and a second side opposite the first side, the first side including a plurality of narrow strip reflective parts, the second side including a plurality of narrow strip transmissive parts, the reflective parts and the transmissive parts being alternately disposed in parallel in one of a horizontal direction and a vertical direction, the second side including a plurality of gaps disposed between the transmissive parts and aligned with the reflective parts, the gaps being a dark color; and a single projector emitting a projection light to the first side of the image display screen, the single projector directing a first portion of the projection light to the reflective parts, the reflective parts reflecting the first portion of projection light to display a first image on the first side of the image display screen, the first image being visible only on the first side of the image display screen, the single projector directing a second portion of the projection light through the image display screen to the transmissive portions, the transmissive portions transmitting the second portion of projection light to display a second image on the second side of the image display screen, the second image being visible only on the second side of the image display screen.

* * * * *